Nov. 16, 1948.　　　A. E. WIEDENHOEFT　　　2,454,243
LIGHTING FIXTURE

Filed Sept. 7, 1945　　　　　　　　　　　　2 Sheets-Sheet 1

Inventor:
Arthur E. Wiedenhoeft
By Kent W. Worrell
Attorney

Nov. 16, 1948.  A. E. WIEDENHOEFT  2,454,243
LIGHTING FIXTURE

Filed Sept. 7, 1945  2 Sheets-Sheet 2

Inventor:
Arthur E. Wiedenhoeft
By Kurt W. Worrell
Attorney

Patented Nov. 16, 1948

2,454,243

UNITED STATES PATENT OFFICE 2,454,243

LIGHTING FIXTURE

Arthur E. Wiedenhoeft, Glen Ellyn, Ill.

Application September 7, 1945, Serial No. 614,881

9 Claims. (Cl. 240—51.12)

This invention relates in general to a lighting fixture of the combined direct and indirect type and is more particularly described as a ceiling type of fixture combining incandescent and fluorescent lamps.

An important object of the invention is to provide a lighting fixture having means for supporting a circular tube type of lamp adjacent a central incandescent lamp with a light reflecting or modifying shade or globe between them.

A further object of the invention is to provide a circular fluorescent tube lamp supporter having supporting means movable out of the path of the lamp and then below the lamp for quickly and easily applying and removing a lamp of this type.

Still a further object of the invention is to provide an electric fixture having a circular fluorescent tube supported at one side of a globe or reflector and an incandescent lamp supported at the other side of the globe or reflector, the illumination of each lamp supplementing or modifying the other.

Other objects of the invention will appear in the specification and will be apparent from the accompanying drawings in which Fig. 1 is a sectional view of a lighting fixture of the ceiling type in accordance with this invention;

Figure 1:
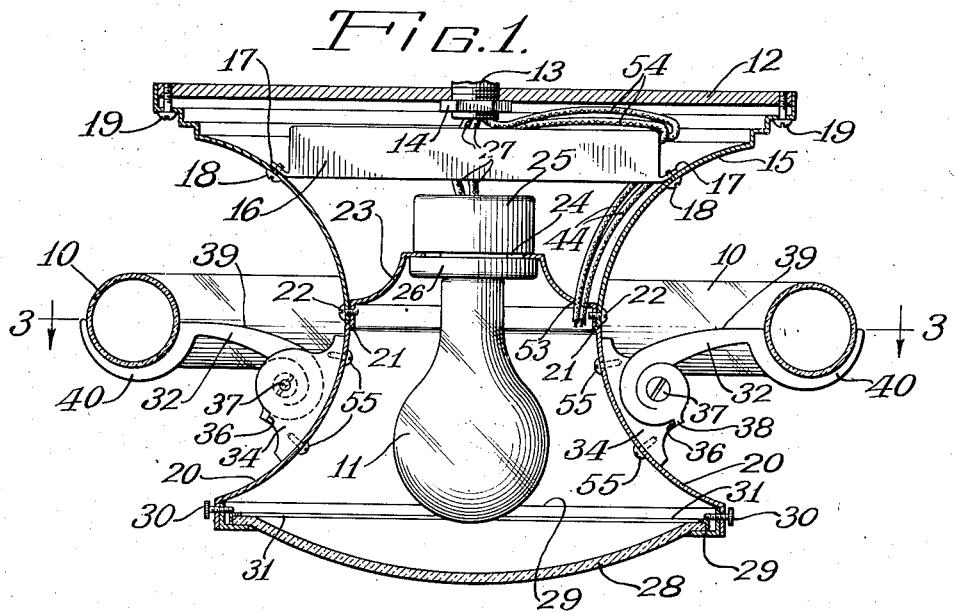
Figure 2:
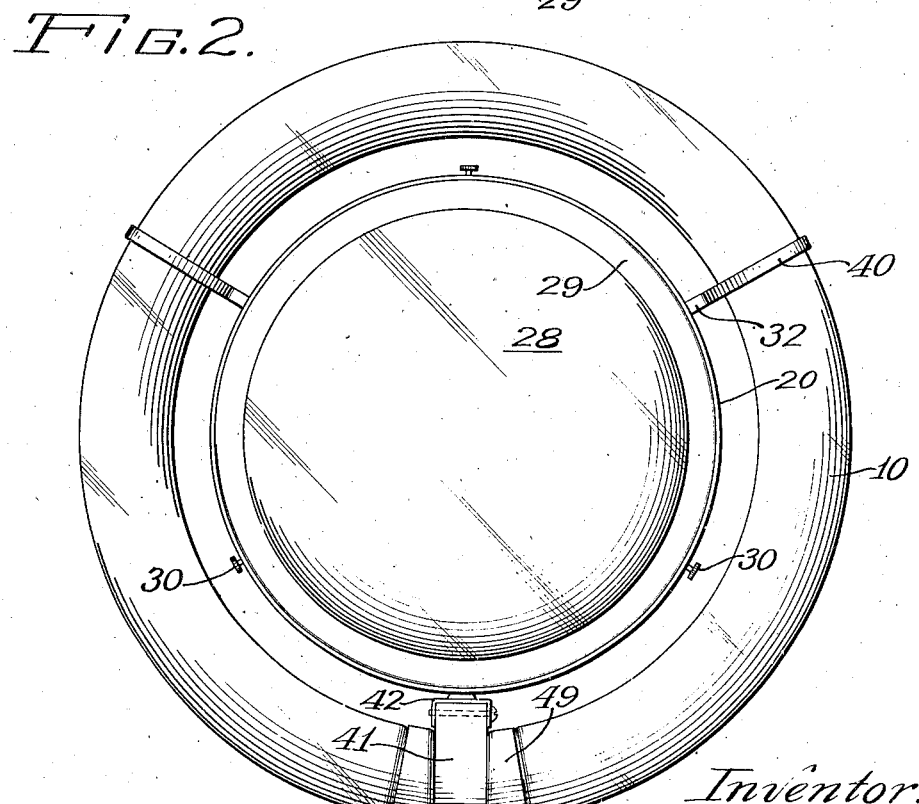
Fig. 2 is a bottom plan view of the fixture shown in Fig. 1.
Figure 3:
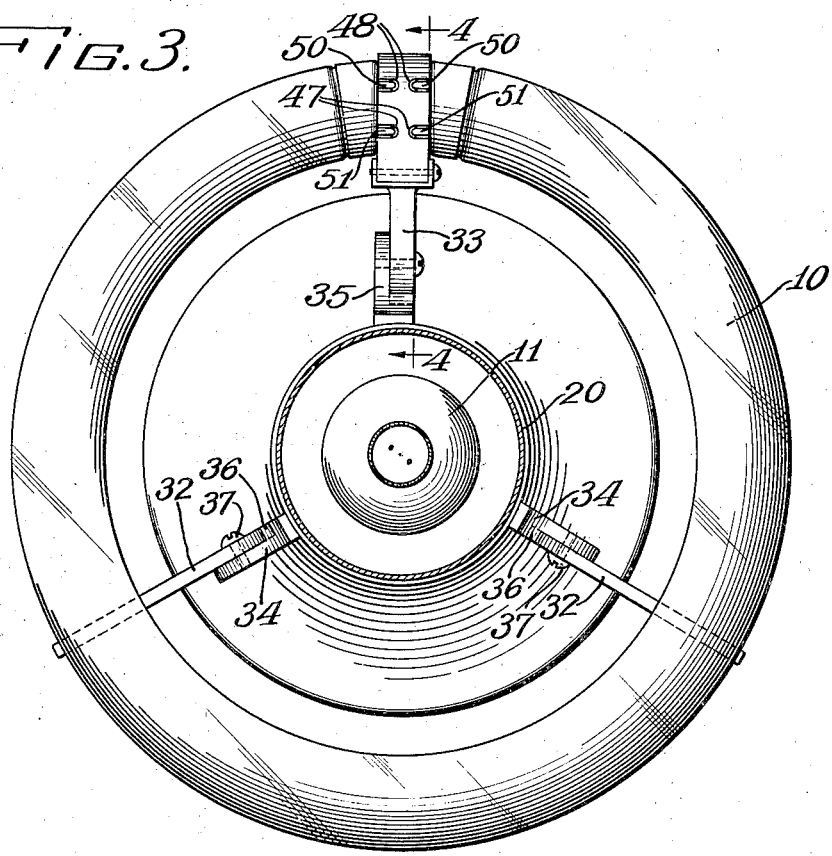
Fig. 3 is a sectional plan view taken from above the circular lamp and on the line 3—3 of Fig. 1.
Figure 4:
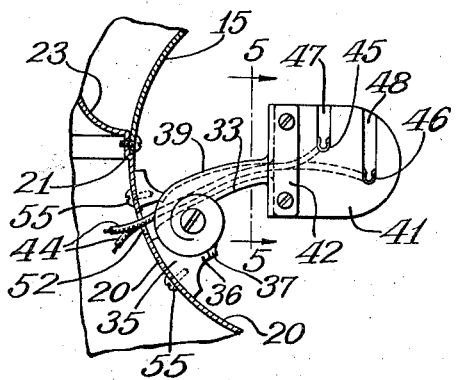
Fig. 4 is a detail section taken on the line 4—4 of Fig. 3.
Figure 5:
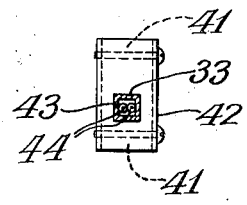
Fig. 5 is a transverse section taken on the line 5—5 of Fig. 4.

In adding a circular luminescent tubular lamp to the lighting fixture art a new and improved combination of tube and incandescent lamps is possible, the tubular lamps surrounding the incandescent lamps and providing direct and indirect lighting either alone or in combination with the incandescent lamp so that either one may be separately illuminated or both may be lighted at the same time and the illumination of each will modify the other to the extent by the globe or reflector interposed between them.

Referring now more particularly to the drawings, a tubular lamp 10 of the fluorescent type and an incandescent lamp 11 are supported as a part of the same lighting fixture, the tubular lamp being shown as surrounding the incandescent lamp. If the tubular lamp is of sufficient circular extent a number of incandescent lamps may be included within it, and if desired a number of circular tubular lamps of the same or graduated sizes may be supported outside of the incandescent lamp or lamps, and surrounding them.

This fixture comprises a wall or ceiling strip or plate 12 having a central opening through which a threaded end 13 of a fixture conduit projects, the extremity of which is engaged by a lock nut 14 for holding the ceiling plate in place. Supported by the plate 12, is an upper reflector 15, curving inwardly and converging downwardly, but affording space within it adjacent the top of the fixture for a reactor or transformer 16 as commonly employed in the tubular fluorescent lamps. The transformer may be secured to the reflector in any suitable manner as by means of ears 17 connected to the reflector by fastening screws 18. The upper edge of the reflector may be secured to the supporting plate by fastening screws 19 or any other suitable fastening means.

Attached to and supported at the bottom edge of the upper reflector 15 is a lower reflector 20 which flares outwardly at the bottom and has a reduced shouldered portion 21 at its upper edge to fit inwardly at the lower edge of the upper reflector section 15 to which it is secured by suitable fastening screws 22. An upper or inner portion 23 of the lower reflector has a central perforation 24 for receiving an incandescent socket 25 at the upper side of the perforation 24 and a lower flange portion 26 which is secured into the socket 25 through the opening 24 in a well known manner, thereby tightly anchoring the section to the inner portion 23 of the lower shade section and providing a firm support for the incandescent lamp 11 which is threaded into the socket. Conductors 27 extend from the conduit to the inner end of the socket 25.

At the bottom of the lower reflector section 20 is a glass bowl 28 the edge of which extends within the edge of the reflector to which it is removably secured by an angular flanged rim 29 seated within the lower edges of the lower reflector section by fastening screws 30. If desired an inner clamping ring 31 may be inserted over the upper edge of the glass bowl and engaged by the inner ends of the fastening screws 30 to hold the bowl tightly in place.

To support the circular fluorescent lighting tube 10 a plurality of arms 32 and 33 are pivoted to the outer side of the lower reflector section at spaced intervals and are supported therefrom by pivoted blocks 34 and 35. Each block has a stop or abutment 36 at its lower side and a pivot screw 37 upon which the corresponding arm is pivoted.

Each arm 32 or 33 has a projection 38 adapted to engage the abutment 36 of the supporting block, limiting the downward movement of the arm from its supporting position. The upper side 39 of each arm is curved conversely with a supporting hook 40 at the end of each arm 32 and with a terminal block 41 at the end of the arm 33 supported by a bracket 42 with the end arm.

The arms 32 may be solid but the arm 33 is hollow or has a longitudinal passage 43 to receive conductors 44 which extend to terminals 45 and 46 at the bottoms of slots 47 and 48 respectively at opposite sides of the block 41.

At the ends of the circular tube are terminal fittings 49 having terminals 50 and 51 movable downwardly from the top in the slots 48 and 47 respectively and engaging the terminals 46 and 45 therein. The conductors 44 leading therefrom extend through an opening 52 in the lower reflector 20 at the base of supporting block 35 and thence through an opening 53 in the upper portion 23 of the lower reflector 20 to the transformer 16 supported in the upper reflector section, conductors 54 extending from the transformer and into the supporting conduit to a suitable source of current supply.

The supporting blocks 34 and 35 are attached to the lower reflector by screws 55 inserted thereinto from the inside of the reflector, or in any other suitable manner, the inner face of the block conforming in curvature to the curved surface of the reflector, and the arms which are pivoted in the blocks are rotatable upwardly away from the abutments 36, when the tubular lamp 10 is correspondingly raised or before it is applied to the fixture, so that the circular lamp may be applied from the bottom of the fixture to a position above the arms in their raised positions whereupon the arms may be swung inwardly and downwardly below the circular lamp and the lamp then lowered and seated in the hooks 40 and engaged with the terminal block 41 by simply pressing the terminals 50 and 51 downwardly in the contact slots provided for them.

With this construction a plurality of circular lamps may be supported by arms of different lengths with respect to the reflector of a fixture of this type, or by suitably arranging the arms a number of circular lamps of the same size may be applied to the outside of the fixture. The arms are also easily detachable by simply removing the pivot screws 37 so that the circular lamps are easily applied to the fixture and removed therefrom, facilitating the repair and replacement of the lamps. With a fixture of this type the fluorescent lamp may be lighted giving direct illumination from the outside and being reflected both upwardly and downwardly by the upper and lower reflector portions. The incandescent lamp may be lighted separately or in conjunction with the tubular lamp each modifying the illumination of the other. The upper and lower reflectors are preferably made of metal but they may also be of transparent or translucent material and more or less reflective, so that the illumination of one lamp is surmounted by the reflected and refracted illumination of the other.

Although a single type of fixture has been described it is apparent that two lamps may be combined in a wide variety of forms and for a wide diversity of uses without departing from the spirit and scope of the invention.

I claim:

1. A lighting fixture comprising a circular tube lamp, a reflector extending downwardly within the lamp, arms movably secured to the reflector to swing within the lamp for admitting it from below past the arms and movable outwardly therefrom for supporting the lamp above and at the ends of the arms.

2. A lighting fixture comprising a circular tubular lamp, a central supporting reflector supported from above, arms pivoted to the reflector and movable thereon to swing inwardly within the lamp to admit the lamp from below and movable outwardly with hooks at the ends to engage below and support the lamp.

3. A lighting fixture comprising a circular tube lamp, a reflector extending from above and centrally within and below the lamp, a plurality of arms secured to the lower portion of the reflector and pivotally mounted thereon to swing inwardly and outwardly within the inside of a lamp to admit the lamp from below past the arms, the outer ends of the arms having hooks for supporting the lamp when the arms are turned outwardly and the arms having mounting brackets for securing them to the reflector with abutments for holding the arms in extended position.

4. In a lighting fixture a circular tube lamp having terminals close together, a central depending reflector with inwardly and outwardly rounded portions above and below the lamp, a plurality of arms pivoted to the reflector to swing within the lamp and movable to admit the lamp from the bottom above the arms, the arms movable outwardly for supporting the tubular lamp in an outward position and one of the arms having terminal connections for engaging the terminal connections of the lamp.

5. In a lighting fixture a circular tube lamp, a central reflector therefor supported from above having a separate inwardly rounded upper portion and an outwardly extending lower portion, a plurality of supporting arms pivotally attached to the lower reflector portion and movable inwardly within the lamp to admit the lamp past the arms and outwardly to engage the lamp, the outer ends of the arms having supporting hooks and one of the arms having terminals for engaging the lamp terminals and having a passage therein for conductors extending through the lower reflector and an electro responsive device mounted in the upper reflector portion and connected to said conductors.

6. In a lighting fixture a wall plate at the top of the fixture, a reflector extending centrally inward and downward therefrom and flaring outwardly at the bottom, a circular fluorescent tube lamp extending around the outside of the reflector between the top and bottom thereof and having adjacent terminals, a plurality of arms for supporting the lamp having a hinge connection with the lower outwardly flaring portion of the reflector and movable upwardly toward the upper reflector portion to pass the tube outwardly of the arms, the arms being rotatable outwardly to support the lamp in horizontal position and circuit connecting means for illuminating the lamp extending from the inside of the reflector through an opening therethrough and through one of the arms to the lamp terminals.

7. A lighting fixture comprising a reflector supported at the top and extending centrally inward therefrom and outwardly at the bottom, a circular fluorescent lamp supported intermediate the top and bottom of and extending around the reflector, arms supported by the reflector to swing inwardly within the lamp to admit it from below past the arms and movable outwardly to engage and support the lamp at the ends of the arms, and an incandescent lighting means mounted within the reflector and extending downwardly for direct illumination through the bottom of the reflector.

8. In a lighting fixture a reflector extending inwardly and downwardly from the top and extending outwardly at the bottom, a circular tubular lamp surrounding the reflector, means comprising arms pivoted to the reflector and movable inwardly to admit the lamp past the arms and outwardly for supporting the tubular lamp from the reflector in horizontal position, and electric lighting means within the reflector over which the tubular lamp is movable in applying and removing it, for modifying the illumination of the tubular lamp, and for direct illumination at the bottom of the reflector.

9. In a lighting fixture a circular tube lamp, a central support therefor comprising a reflector having an upper portion extending inwardly and downwardly, a lower portion flaring outwardly and having a reduced portion inserted at the bottom of the upper reflector portion, the circular tube lamp surrounding the reflector, a lamp socket secured to the said inserted portion, a lamp insertable in the socket and extending downwardly therefrom and means secured to the lower reflector portion and comprising hinged arms rotatable upwardly and having outer hook extremities, the arms being rotatable inwardly so that the tube lamp can be moved past them and the tube lamp being supported in horizontal position by the hook extremities of the arms.

ARTHUR E. WIEDENHOEFT.

REFERENCES CITED

The following references are of record in the file of this patent:

UNITED STATES PATENTS

| Number | Name | Date |
| --- | --- | --- |
| 900,733 | Hewitt | Oct. 13, 1908 |
| 1,084,362 | Reagan | Jan. 13, 1914 |
| 1,245,177 | Beiswanger | Nov. 6, 1917 |
| 1,604,830 | Hull | Oct. 26, 1926 |
| 2,309,676 | Schmidling | Feb. 2, 1943 |
| 2,313,131 | Elias | Mar. 9, 1943 |
| 2,392,785 | Thomas | Jan. 8, 1946 |